United States Patent [19]
Yurt et al.

[11] Patent Number: 6,002,720
[45] Date of Patent: Dec. 14, 1999

[54] AUDIO AND VIDEO TRANSMISSION AND RECEIVING SYSTEM

[75] Inventors: Paul Yurt, Scottsdale, Ariz.; H. Lee Browne, Greenwich, Conn.

[73] Assignee: H. Lee Browne, D/B/A Greenwich Information Technologies LLC, Greenwich, Conn.

[21] Appl. No.: 08/630,590

[22] Filed: Apr. 10, 1996

Related U.S. Application Data

[63] Continuation of application No. 08/133,982, Oct. 8, 1993, Pat. No. 5,550,863, which is a continuation of application No. 07/862,508, Apr. 2, 1992, Pat. No. 5,253,275, which is a continuation of application No. 07/637,562, Jan. 7, 1991, Pat. No. 5,132,992.

[51] Int. Cl.⁶ ........................................ H04N 7/10
[52] U.S. Cl. .................. 375/240; 375/259; 375/377; 455/4.2; 348/7; 348/8
[58] Field of Search ...................... 375/240, 259, 375/295, 316, 377; 348/1, 6–8, 10, 12–14, 17, 384, 385, 387, 470, 473, 906; 379/90.1, 93.08, 93.1, 101.1, 102.1–102.3; 455/2, 3.1, 4.1, 4.2, 5.1, 6.3

[56] References Cited

U.S. PATENT DOCUMENTS

| | | | |
|---|---|---|---|
| 3,599,178 | 8/1971 | Jackson et al. ...................... 340/172.5 |
| 3,673,318 | 6/1972 | Olsen et al. . | |
| 3,746,780 | 7/1973 | Stetten et al. ......................... 178/6.6 A |
| 3,919,462 | 11/1975 | Hartung et al. . | |
| 4,009,344 | 2/1977 | Flemming ........................... 179/15 BS |
| 4,009,346 | 2/1977 | Parker et al. ...................... 179/15 AQ |
| 4,028,733 | 6/1977 | Ulicki ....................................... 358/86 |
| 4,062,043 | 12/1977 | Zeidler et al. ............................ 358/86 |
| 4,071,697 | 1/1978 | Bushnell et al. ...................... 179/2 TV |
| 4,122,299 | 10/1978 | Cannon ................................ 178/26 A |
| 4,206,316 | 6/1980 | Burnsweig et al. ....................... 375/43 |
| 4,245,245 | 1/1981 | Matsumoto et al. . | |
| 4,280,139 | 7/1981 | Mogi et al. . | |
| 4,295,154 | 10/1981 | Hata et al. ................................ 358/4 |
| 4,333,110 | 6/1982 | Faerber et al. . | |
| 4,354,201 | 10/1982 | Sechet et al. . | |
| 4,381,522 | 4/1983 | Lambert .................................... 358/86 |
| 4,400,717 | 8/1983 | Southworth et al. ..................... 358/13 |
| 4,450,477 | 5/1984 | Lovett ...................................... 358/86 |
| 4,488,179 | 12/1984 | Krüger et al. . | |
| 4,506,387 | 3/1985 | Walter ..................................... 455/612 |
| 4,518,989 | 5/1985 | Yabiki et al. ............................. 358/86 |
| 4,521,806 | 6/1985 | Abraham ................................. 358/86 |
| 4,533,936 | 8/1985 | Tiemann et al. ......................... 358/12 |
| 4,538,176 | 8/1985 | Nakajima et al. ........................ 358/86 |
| 4,567,512 | 1/1986 | Abraham ................................. 358/86 |
| 4,590,516 | 5/1986 | Abraham ................................. 358/86 |

(List continued on next page.)

FOREIGN PATENT DOCUMENTS

| | | |
|---|---|---|
| 0 309 298 | 9/1989 | European Pat. Off. . |
| 0355697A2 | 2/1990 | European Pat. Off. . |
| 83/02208 | 6/1983 | WIPO . |
| WO84/00863 | 3/1984 | WIPO . |
| WO89/12370 | 12/1989 | WIPO . |

OTHER PUBLICATIONS

Sandburg, "E–Data Backs Off Patent Claims," *The Recorder* (Apr. 2, 1999).

Ernie Ohrenstein, "Supercomputers Seek High Throughput and Expandable Storage", Computer Technology Review, IEEE Spectrum, May, 1990, pp. 33–43.

Patricia A. Morreale, et al., "Metropolitan–Area Networks," IEEE Spectrum, May 1990, pp. 40–43.

*Primary Examiner*—Amanda T. Le
*Attorney, Agent, or Firm*—Andrea G. Reister; Erik B. Milch; Howrey & Simon

[57] ABSTRACT

A system of distributing video and/or audio information employs digital signal processing to achieve high rates of data compression. The compressed and encoded audio and/or video information is sent over standard telephone, cable or satellite broadcast channels to a receiver specified by a subscriber of the service, preferably in less than real time, for later playback and optional recording on standard audio and/or video tape.

11 Claims, 12 Drawing Sheets

U.S. PATENT DOCUMENTS

| | | |
|---|---|---|
| 4,636,876 | 1/1987 | Schwartz . |
| 4,679,079 | 7/1987 | Catros et al. ............................ 358/135 |
| 4,688,246 | 8/1987 | Eilers et al. ................................ 380/9 |
| 4,734,764 | 3/1988 | Pocock et al. . |
| 4,734,765 | 3/1988 | Okada et al. ............................ 358/102 |
| 4,755,872 | 7/1988 | Bestler et al. ............................. 358/86 |
| 4,755,889 | 7/1988 | Schwartz . |
| 4,763,191 | 8/1988 | Gordon et al. ............................ 358/86 |
| 4,785,349 | 11/1988 | Keith et al. .............................. 358/136 |
| 4,792,849 | 12/1988 | McCalley et al. . |
| 4,807,023 | 2/1989 | Bestler et al. ............................. 358/86 |
| 4,829,372 | 5/1989 | McCalley et al. . |
| 4,833,710 | 5/1989 | Hirashima ................................. 380/20 |
| 4,847,677 | 7/1989 | Music et al. ............................... 358/13 |
| 4,847,827 | 7/1989 | Tompkins et al. ....................... 370/62 |
| 4,868,653 | 9/1989 | Golin et al. ............................. 358/133 |
| 4,890,320 | 12/1989 | Monslow et al. ......................... 380/10 |
| 4,907,081 | 3/1990 | Okamura et al. ....................... 358/133 |
| 4,914,508 | 4/1990 | Music et al. ............................... 358/13 |
| 4,920,432 | 4/1990 | Eggers et al. ........................... 360/33.1 |
| 4,937,821 | 6/1990 | Boulton ................................... 370/124 |
| 4,947,244 | 8/1990 | Fenwick et al. ........................... 358/86 |
| 4,949,169 | 8/1990 | Lumelsky et al. ......................... 358/86 |
| 4,949,187 | 8/1990 | Cohen ...................................... 358/335 |
| 4,963,995 | 10/1990 | Lang ........................................ 358/335 |
| 4,975,771 | 12/1990 | Kassatly . |
| 5,014,267 | 5/1991 | Tompkins et al. ........................ 370/62 |
| 5,032,927 | 7/1991 | Watanabe et al. ................. 398/133 X |
| 5,057,927 | 10/1991 | Lang . |
| 5,057,932 | 10/1991 | Lang ........................................ 358/133 |
| 5,062,136 | 10/1991 | Gattis et al. . |
| 5,091,938 | 2/1992 | Thompson et al. . |
| 5,093,718 | 3/1992 | Hoarty et al. ............................. 358/84 |
| 5,109,414 | 4/1992 | Harvey et al. . |
| 5,113,496 | 5/1992 | McCalley et al. . |
| 5,119,188 | 6/1992 | McCalley et al. . |
| 5,129,036 | 7/1992 | Dean et al. . |
| 5,130,792 | 7/1992 | Tindell et al. ............................... 348/7 |
| 5,132,992 | 7/1992 | Yurt ........................................ 375/122 |
| 5,133,079 | 7/1992 | Ballantyne et al. ......................... 348/7 |
| 5,164,839 | 11/1992 | Lang ........................................ 358/335 |
| 5,191,573 | 3/1993 | Hair . |
| 5,195,092 | 3/1993 | Wilson et al. ............................. 348/13 |
| 5,239,540 | 8/1993 | Rovira et al. . |
| 5,249,164 | 9/1993 | Koz . |
| 5,276,866 | 1/1994 | Paolini ..................................... 395/603 |
| 5,341,175 | 8/1994 | Koz . |
| 5,381,347 | 1/1995 | Gery . |
| 5,473,362 | 12/1995 | Fitzgerald et al. . |
| 5,502,503 | 3/1996 | Koz . |
| 5,517,257 | 5/1996 | Dunn et al. . |
| 5,566,301 | 10/1996 | Koz et al. . |
| 5,581,297 | 12/1996 | Koz et al. . |
| 5,592,233 | 1/1997 | Koz . |
| 5,594,730 | 1/1997 | Koz et al. . |
| 5,600,368 | 2/1997 | Matthews, III . |
| 5,630,094 | 5/1997 | Hayek et al. . |
| 5,644,355 | 7/1997 | Koz et al. . |
| 5,648,824 | 7/1997 | Dunn et al. . |
| 5,654,748 | 8/1997 | Matthews, III . |
| 5,675,734 | 10/1997 | Hair . |
| 5,687,331 | 11/1997 | Volk et al. . |
| 5,701,511 | 12/1997 | Smith . |
| 5,721,829 | 2/1998 | Dunn et al. . |
| 5,721,950 | 2/1998 | Tobagi et al. . |
| 5,724,543 | 3/1998 | Ozden et al. . |
| 5,732,239 | 3/1998 | Tobagi et al. . |
| 5,734,119 | 3/1998 | France et al. . |
| 5,734,925 | 3/1998 | Tobagi et al. . |
| 5,737,495 | 4/1998 | Adams et al. . |
| 5,742,773 | 4/1998 | Blomfield-Brown et al. . |
| 5,751,282 | 5/1998 | Girard et al. . |
| 5,774,172 | 6/1998 | Kapell et al. . |
| 5,781,227 | 7/1998 | Sposato . |
| 5,793,980 | 8/1998 | Glaser et al. . |
| 5,799,113 | 8/1998 | Lee . |
| 5,801,692 | 9/1998 | Muzio et al. . |
| 5,802,394 | 9/1998 | Baird et al. . |
| 5,815,145 | 9/1998 | Matthews, III . |
| 5,815,195 | 9/1998 | Tam . |
| 5,815,662 | 9/1998 | Ong . |
| 5,815,689 | 9/1998 | Shaw et al. . |
| 5,818,972 | 10/1998 | Girod et al. . |
| 5,826,110 | 10/1998 | Ozden et al. . |
| 5,832,309 | 11/1998 | Noe et al. . |
| 5,835,495 | 11/1998 | Ferriere . |
| 5,844,594 | 12/1998 | Ferguson . |
| 5,852,705 | 12/1998 | Hanko et al. . |
| 5,861,906 | 1/1999 | Dunn et al. . |

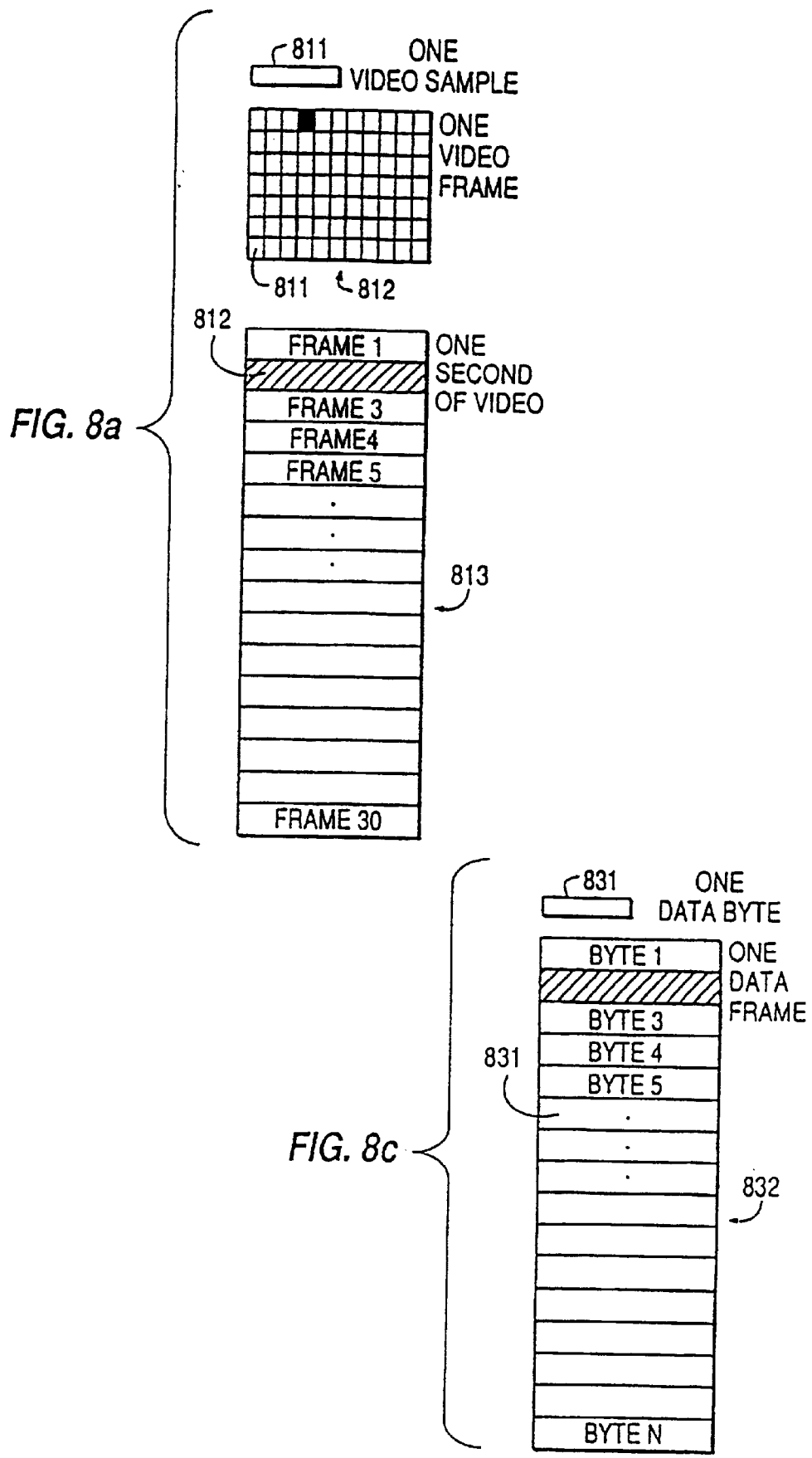

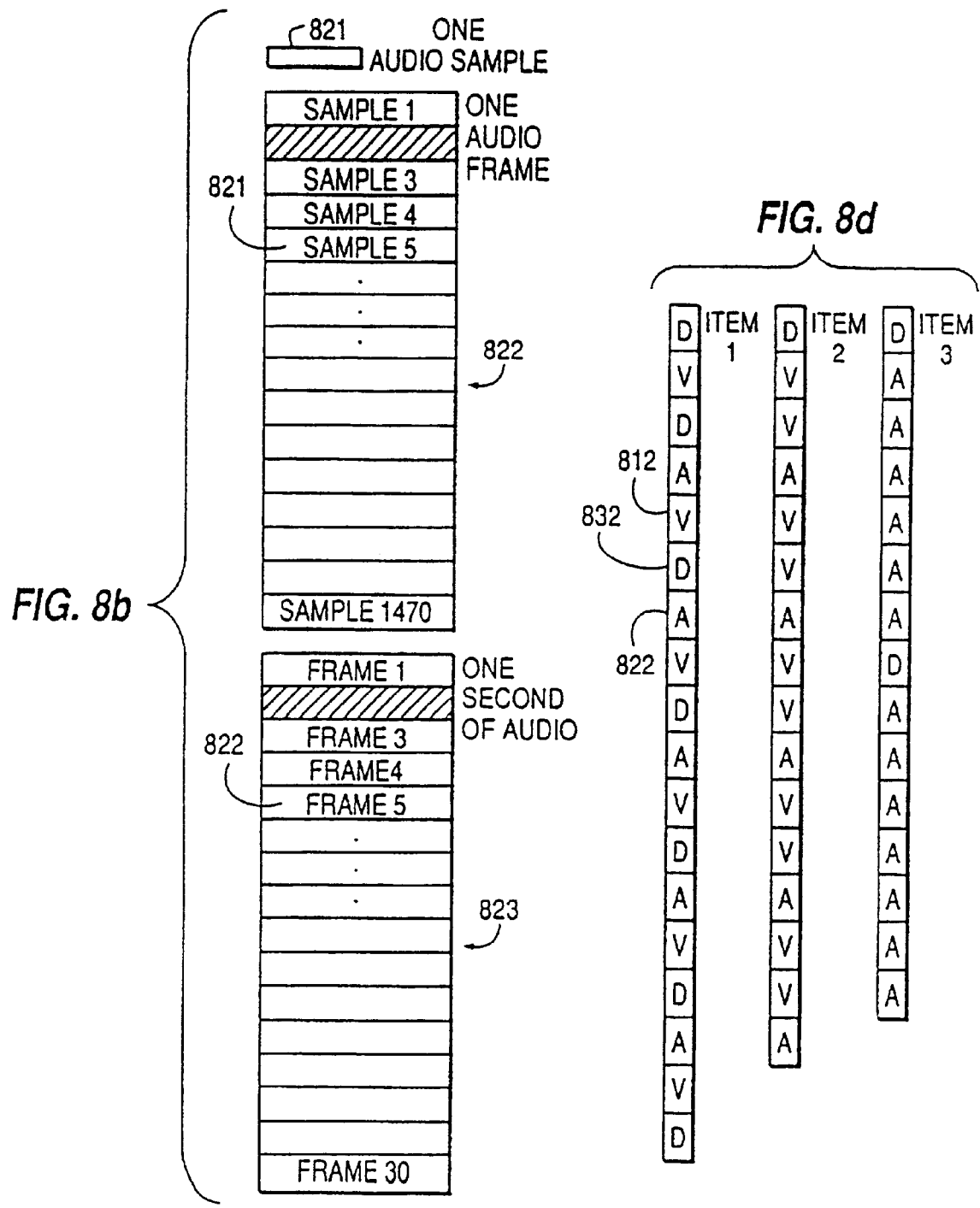

AUDIO AND VIDEO TRANSMISSION AND RECEIVING SYSTEM

This is a continuation of application Ser. No. 08/133,982, filed Oct. 8, 1993, U.S. Pat. No. 5,550,863 which is a continuation application of prior application Ser. No. 07/862,508 filed Apr. 2, 1992 which issued as U.S. Pat. No. 5,253,275 on Oct. 12, 1993, which is a continuation application of prior application Ser. No. 07/637,562 filed Jan. 7, 1991 which issued as U.S. Pat. No. 5,132,992 on Jul. 21, 1992.

BACKGROUND OF THE INVENTION

The present invention relates generally to an audio and video transmission and receiving system, and more specifically to such a system in which the user controls the access and the playback operations of selected material.

At the present time, only a video cassette recorder (VCR) or a laser disk player (LDP) allow a viewer to enjoy control over selection of particular audio/video material. Using either a VCR or an LDP requires the viewer to obtain a video tape either by rental or by purchase. Remote accessing of the material has not yet been integrated into an efficient system.

Several designs have been developed which provide the viewer with more convenient means of accessing material. One such design is disclosed in U.S. Pat. No. 4,506,387, issued to Walter. The Walter patent discloses a fully dedicated, multi-conductor, optical cable system that is wired to the viewer's premises. While the system affords the viewer some control over accessing the material, it requires that a location designated by the viewer be wired with a dedicated cable. The Walter system further requires the viewer be at that location for both ordering and viewing the audio/video material.

U.S. Pat. No. 4,890,320, issued to Monslow, describes a system which broadcasts viewer selected material to a viewer at a prescribed time. This system is limited in that it requires multiple viewers in multiple locations to view the audio/video material at the time it is broadcast, rather than allowing each viewer to choose his or her own viewing time. The system disclosed in Monslow also does not allow for the stop, pause, and multiple viewing functions of existing VCR technology.

U.S. Pat. No. 4,590,516, issued to Abraham, discloses a system that uses a dedicated signal path, rather than multiple common carriers, to transmit audio/video programming. The receiver has no storage capability. The system provides for only display functions, which limits viewing to the time at which the material is ordered. Like Monslow, the Abraham system does not allow for the stop, pause, and multiple viewing functions of existing VCR technology.

U.S. Pat. No. 4,963,995, issued to Lang, discloses an audio/video transceiver with the capability of editing and/or copying from one video tape to another using only a single tape deck. Lang does not disclose a system with one or more libraries wherein a plurality of system subscribers may access information stored in the film and tape library or libraries, and play back the selected information at a time and place selected by the subscriber.

It is therefore an object of the present invention to provide a user with the capability of accessing audio/video material by integrating both accessing and playback controls into a system that can use multiple existing communications channels.

It is a further object of the present invention to provide a picture and sound transmission system which allows the user to remotely select audio/video material from any location that has either telephone service or a computer.

A still further object of the present invention is to provide a picture and sound transmission system wherein the selected audio/video material is sent over any one of several existing communication channels in a fraction of real time to any location chosen by the user that has a specified receiver.

Another object of the present invention is to provide a picture and sound transmission system wherein the user may play back the selected audio/video material at any time selected by user and retain a copy of the audio/video material for multiple playbacks in the future.

Another object of the present invention is to provide a picture and sound transmission system wherein the information requested by the user may be sent as only audio information, only video information, or as a combination of audio and video information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the objects in accordance with the purposes of the present invention, as embodied and described herein, the transmission and receiving system for providing information to remote locations comprises source material library means prior to identification and compression; identification encoding means for retrieving the information for the items from the source material library means and for assigning a unique identification code to the retrieved information; conversion means, coupled to identification encoding means, for placing the retrieved information into a predetermined format as formatted data; ordering means, coupled to the conversion means, for placing the formatted data into a sequence of addressable data blocks; compression means, coupled to the ordering means, for compressing the formatted and sequenced data; compressed data storing means, coupled to the compression means, for storing as a file the compressed sequenced data received from the compression means with the unique identification code assigned by the identification encoding means; and transmitter means, coupled to the compressed data storing means, for sending at least a portion of a specific file to a specific one of the remote locations.

The present invention further comprises a distribution method responsive to requests identifying information to be sent from a transmission system to a remote location, the method comprising the steps of storing audio and video information in a compressed data form; requesting transmission, by a user, of at least a part of the stored compressed information to the remote location; sending at least a portion of the stored compressed information the remote location; receiving the sent information at the remote location; buffering the processed information at the remote location; and playing back the buffered information in real time at a time requested by the user.

Additionally, the present invention comprises a receiving system responsive to a user input identifying a choice of an item stored in a source material library to be played back to the subscriber at a location remote from the source material library, the item containing information to be sent from a transmitter to the receiving system, and wherein the receiving system comprises transceiver means for automatically receiving the requested information from the transmitter as compressed formatted data blocks; receiver format conversion means, coupled to the transceiver means, for converting the compressed formatted data blocks into a format suitable for storage and processing resulting in playback in real time; storage means, coupled to the receiver format conversion means, for holding the compressed formatted data; decompressing means, coupled to the receiver format conversion means, for decompressing the compressed formatted information; and output data conversion means, coupled to the decompressing means, for playing back the decompressed information in real time at a time specified by the user.

BRIEF DESCRIPTION OF THE DRAWINGS

The accompanying drawings, which are incorporated in and constitute a part of the specification, illustrate the presently preferred apparatus and method of the invention and, together with the general description given above and the detailed description of the preferred embodiment given below serve to explain the principles of the invention. In the drawings:

FIGS. 8a–8e are block diagrams of preferred implementation of data structures and data blocking for items in the audio and video distribution system of the present invention.

DESCRIPTION OF THE PREFERRED EMBODIMENTS

FIGS. 1a–1g are high level block diagrams showing different configurations of the transmission and receiving system of the present invention. FIGS. 1a, 1b, 1d, 1e, 1f, and 1g each show transmission system 100, described in more detail below with respect to FIGS. 2a and 2b. A user of the transmission and receiving system of the present invention preferably accesses transmission system 100 by calling a phone number or by typing commands into a computer. The user then chooses audio and/or video material from a list of available items which he or she wants to listen to and/or watch.

Figure 1A:
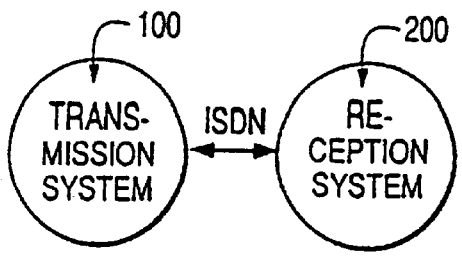
FIGS. 1a–1g are high level block diagrams showing different configurations of the transmission and receiving system of the present invention.
Figure 1B:
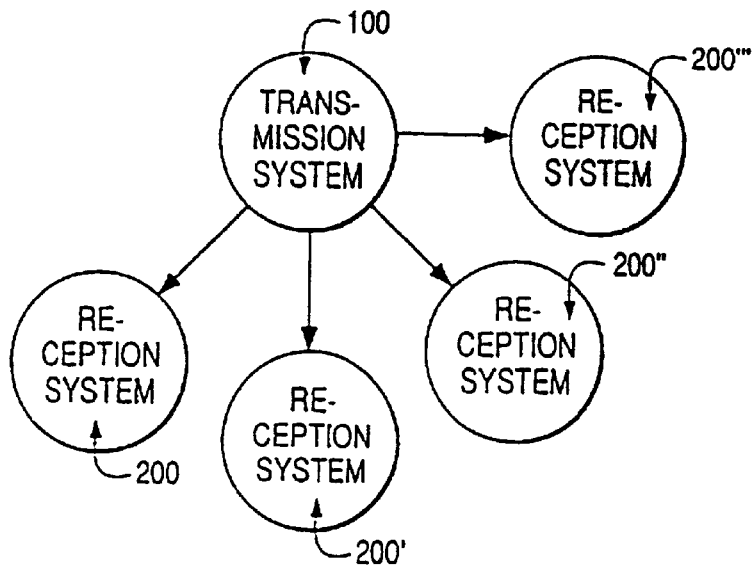

As shown in FIG. 1a, the transmission and receiving system may preferably comprise a peer to peer configuration where one transmission system 100 communicates with one reception system 200. As shown in FIG. 1b, the transmission and receiving system of the present invention may alternatively comprise a plurality of reception systems 200, 200', 200", and 200"', which are each associated with a single transmission system 100.

Figure 1D:
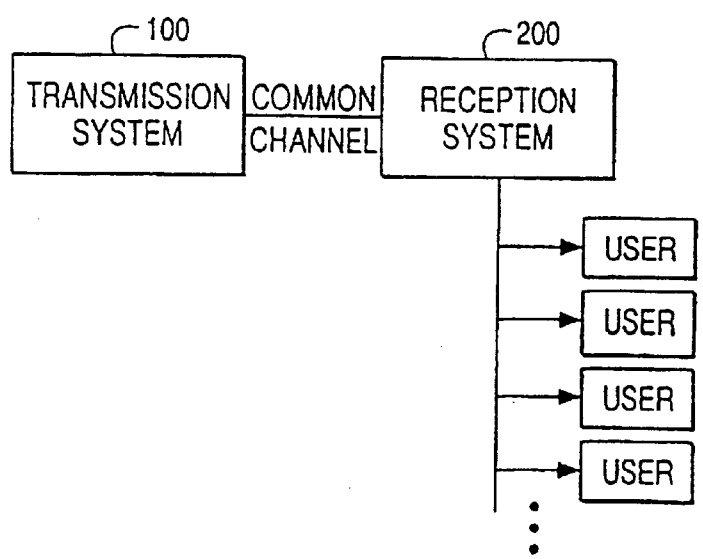
Figure 1C:
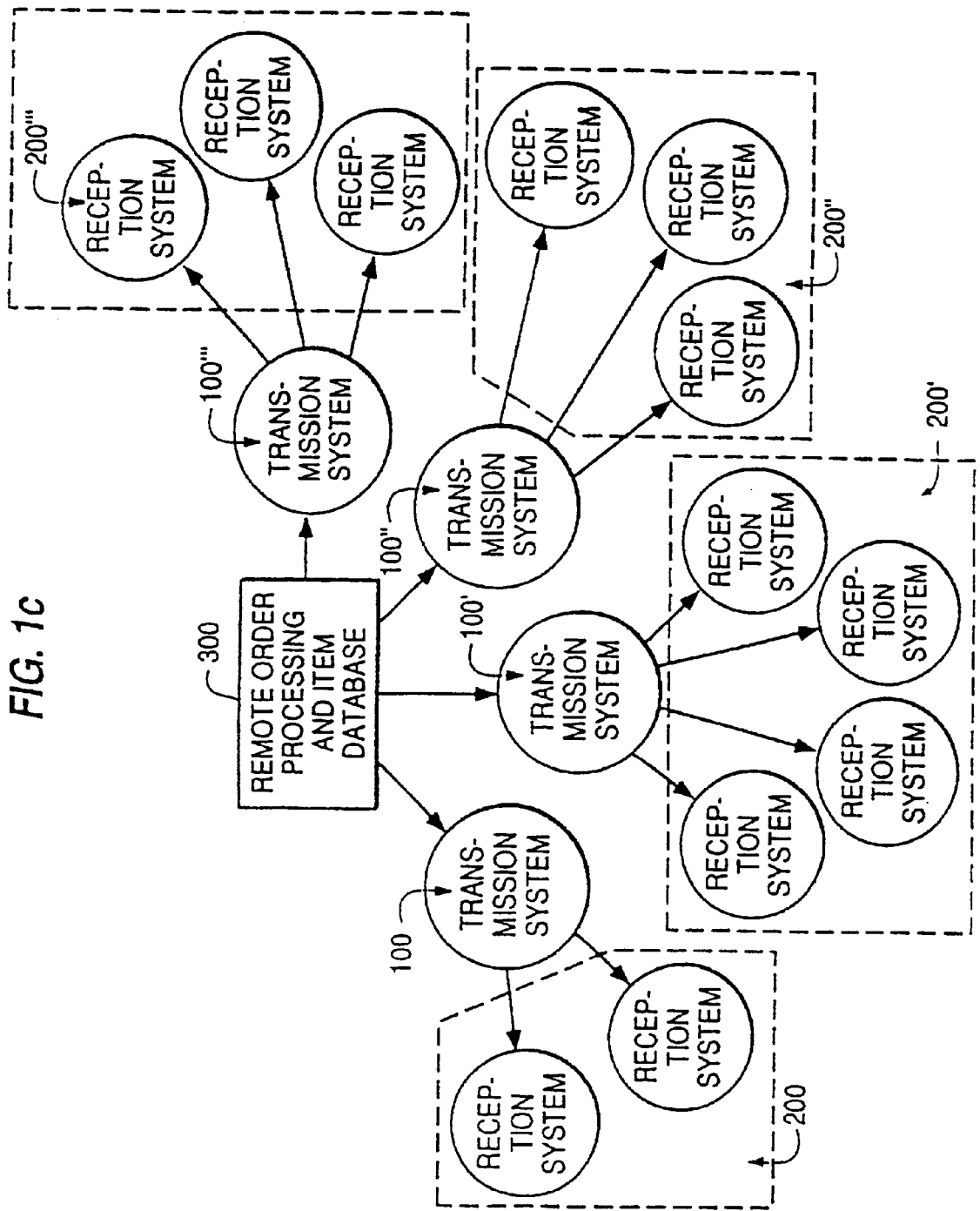
Figure 3:
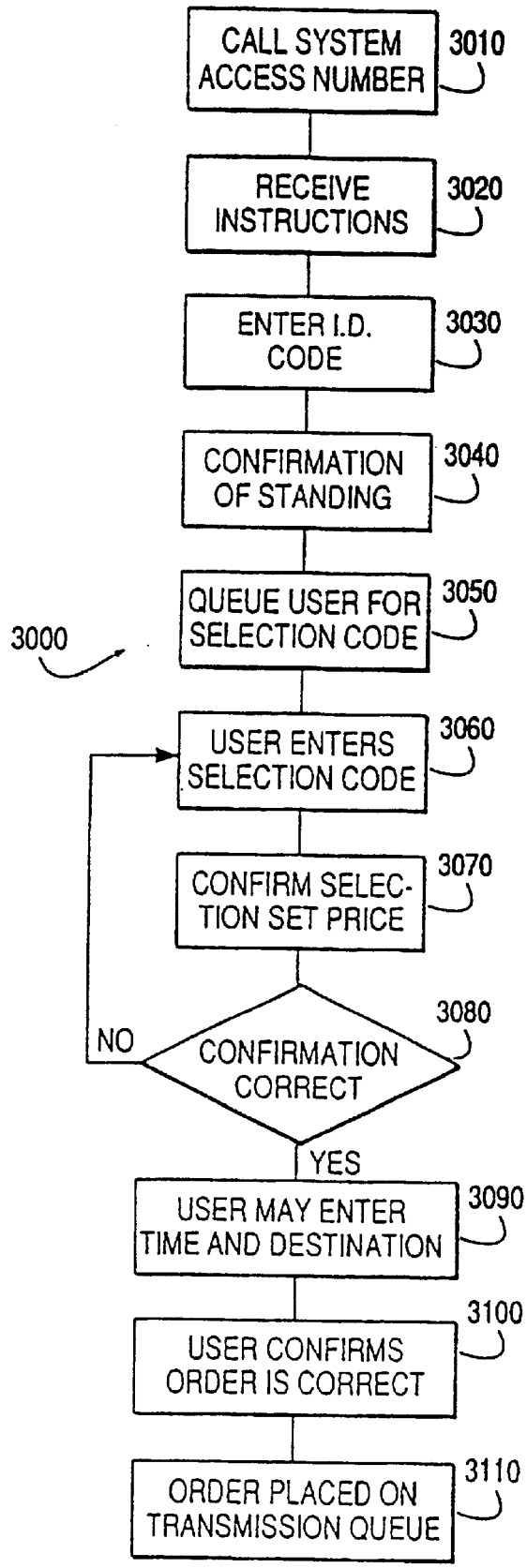
FIG. 3 is a flowchart of a preferred method of ordering a selection from a library in accordance with the present invention.

FIG. 1c shows a high level block diagram of the transmission and receiving system of the present invention including remote order processing and item database 300, described in more detail with respect to FIG. 3. Remote order processing and item database 300 preferably enables users to access desired items by remote communication. The remote order processing and item database 300 may communicate with a plurality of transmission systems 100, 100', 100", and 100"', each of which communicates with a respective set of reception systems 200, 200', 200", and 200"'. Each of the reception systems in sets 200, 200', 200", and 200"' may preferably communicate with a plurality of users.

FIG. 1d shows a high level block diagram of the transmission and receiving system of the present invention including a transmission system 100 distributing to a plurality of users via a reception system 200 configured as a cable television system.

Figure 1E:
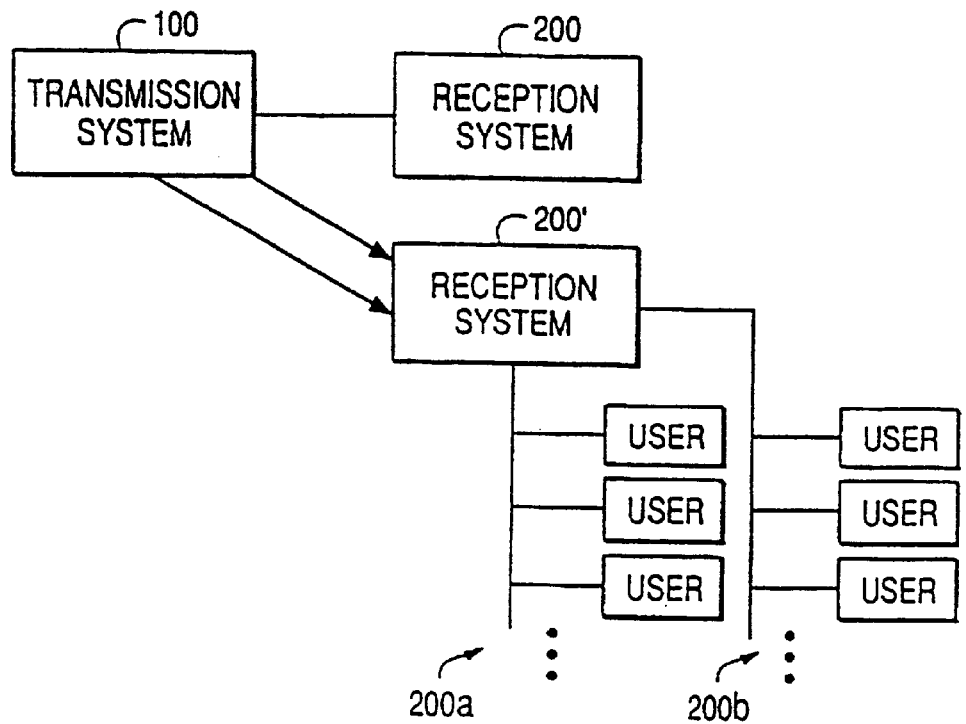

FIG. 1e shows a high level block diagram of the transmission and receiving system of the present invention including a transmission system 100 distributing to a plurality reception systems 200 and 200'. In the configuration shown in FIG. 1e, reception system 200 is a direct connection system wherein a user is directly connected to transmission system 100. Reception system 200' preferably includes a first cable television system 200a and a second cable television system 200b. Users of cable television systems 200a and 200b are indirectly connected to transmission system 100

Figure 1F:
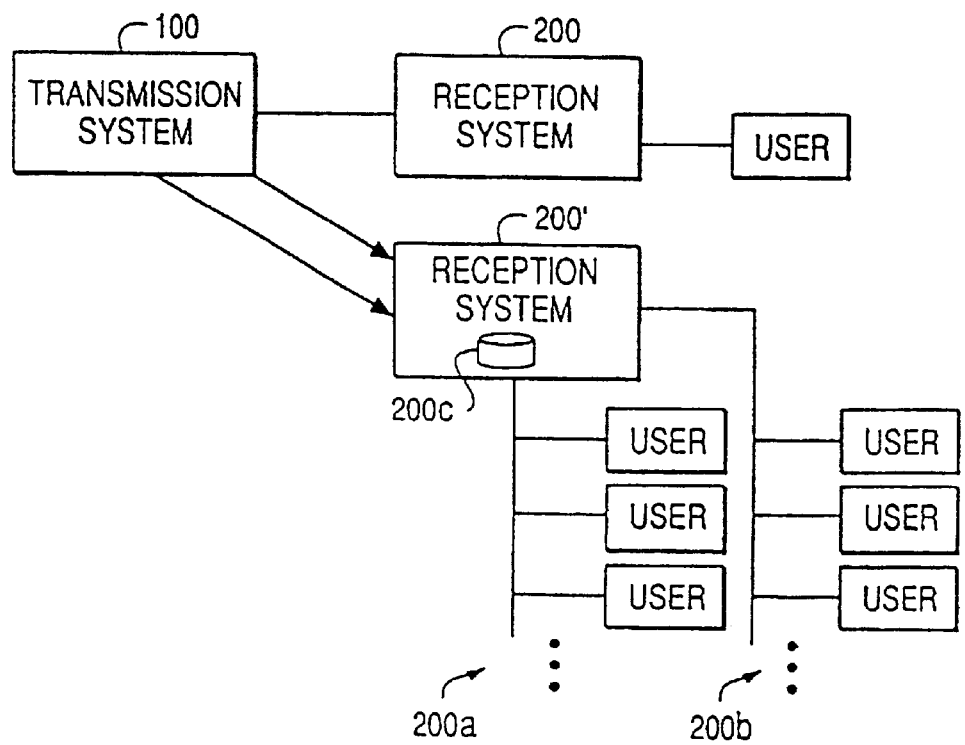

FIG. 1f shows a high level block diagram of the transmission and receiving system of the present invention including transmission system 100 distributing via several channels to reception systems 200 and 200'. Reception system 200 is preferably non-buffering. In such a system, users are directly connected to transmission system 100, as in reception system 200 in FIG. 1e.

Reception system 200' shown in FIG. 1f is a cable television system, as shown in reception system 200' of FIG. 1e. In FIG. 1f, the reception system 200' is preferably buffering, which means that users may receive requested material at a delayed time. The material is buffered in intermediate storage device 200c in reception system 200'.

In the configuration of FIG. 1f, decompression of the requested material may preferably occur at the head end of a cable television reception system 200'. Thus, distribution may be provided to users via standard television encoding methods downstream of the head end of the cable distribution system. This method is preferred for users who only have cable television decoders and standard television receivers.

Figure 1G:
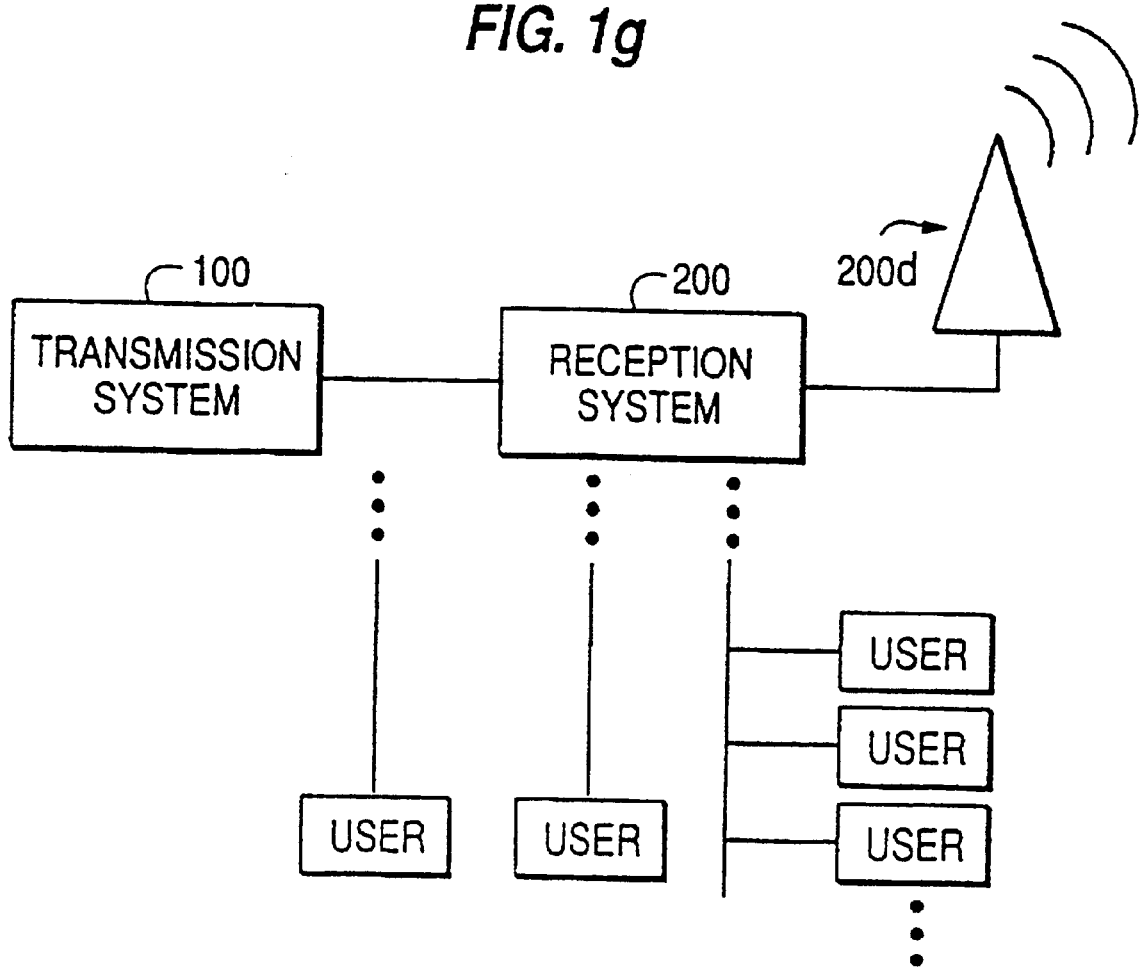

FIG. 1g shows a high level block diagram of the transmission and receiving system of the present invention including transmission system 100 distributing to a reception system 200, which then preferably transmits requested material over airwave communication channels 200d, to a plurality of users. The transmission and receiving system shown in FIG. 1g may preferably transmit either compressed or uncompressed data, depending on the requirements and existing equipment of the user. The airwave transmission and receiving system shown in FIG. 1g may preferably employ either VHF, UHF or satellite broadcasting systems.

With respect to the transmission and receiving systems set forth in FIGS. 1a–1g, the requested material may be fully compressed and encoded, partly decompressed at some stage in transmission system 100, or fully decompressed prior to transmission. The reception systems 200 may either buffer the requested material for later viewing, or decompress in real time the requested material as it is distributed by transmission system 100. Alternatively, the reception systems 200 of the present invention may perform a combination of buffering and non-buffering by buffering some of the requested material and decompressing the remainder of the requested material for immediate viewing as it is distributed by transmission system 100.

In direct connection configurations, such as reception systems 200 shown in FIGS. 1e and 1f, the user preferably selects the reception system 200 to which the requested material is sent, and optionally selects the time playback of the requested material as desired. Accordingly, the user may remotely access the transmission system 100 from a location different than the location of reception system 200 where the material will be sent and/or played back. Thus, for example, a user may preferably call transmission system 100 from work and have a movie sent to their house to be played back after dinner or at any later time of their choosing.

In non-direct connection reception systems such as shown in reception system 200' of FIG. if, intermediate storage device 200c may preferably include, for example, sixteen hours of random access internal audio and video storage. A reception system with such storage is capable of storing several requested items for future playback. The user could then view and/or record a copy of the decompressed requested material in real time, or compressed in non-real time, at a time of their choosing. Accordingly, the user would not have to make a trip to the store to purchase or rent the requested material.

In any of the transmission and receiving systems illustrate in FIGS. 1a–1g, the requested material may be copy protected. To achieve copy protection, the requested material, as an item, is encoded as copy protected during storage encoding in transmission system 100. The user may then play back the item only one time. The user may also optionally review select portions of the item prior to its automatic erasure from the memory of the reception system 200. In this way, requested material may be distributed to "view only" users and also to "view and copy" users who wish to retain copies of the distributed items.

Copy protected programs, when decompressed and played back would have a copy protection technique applied to the analog and digital output signals. The analog video output is protected from copying through the use of irregular sync signals, which makes the signal viewable on a standard television but not recordable on a audio/video recorder. The receiving system recognizes copy protected programs and disables the audio-video recorder. Digital output protection is effected through copy protect bit settings in the digital output signal, thus preventing a compatible digital recorder from recording the digital audio and/or video signal stream. A protected item will not be passed to the compressed data port of the digital recorder for off line storage.

Figure 2A:
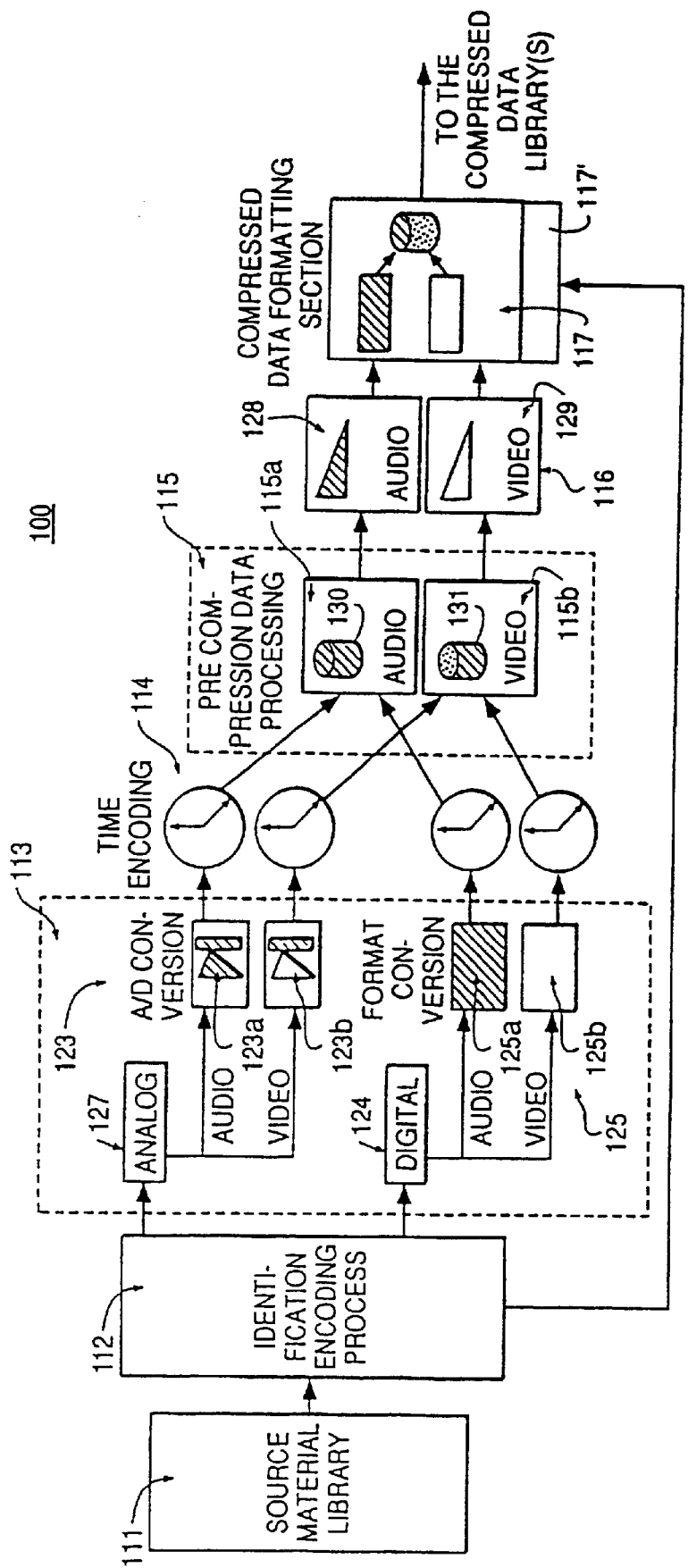
FIGS. 2a and 2b are detailed block diagrams of preferred implementations of the transmission system of the present invention.
Figure 2B:
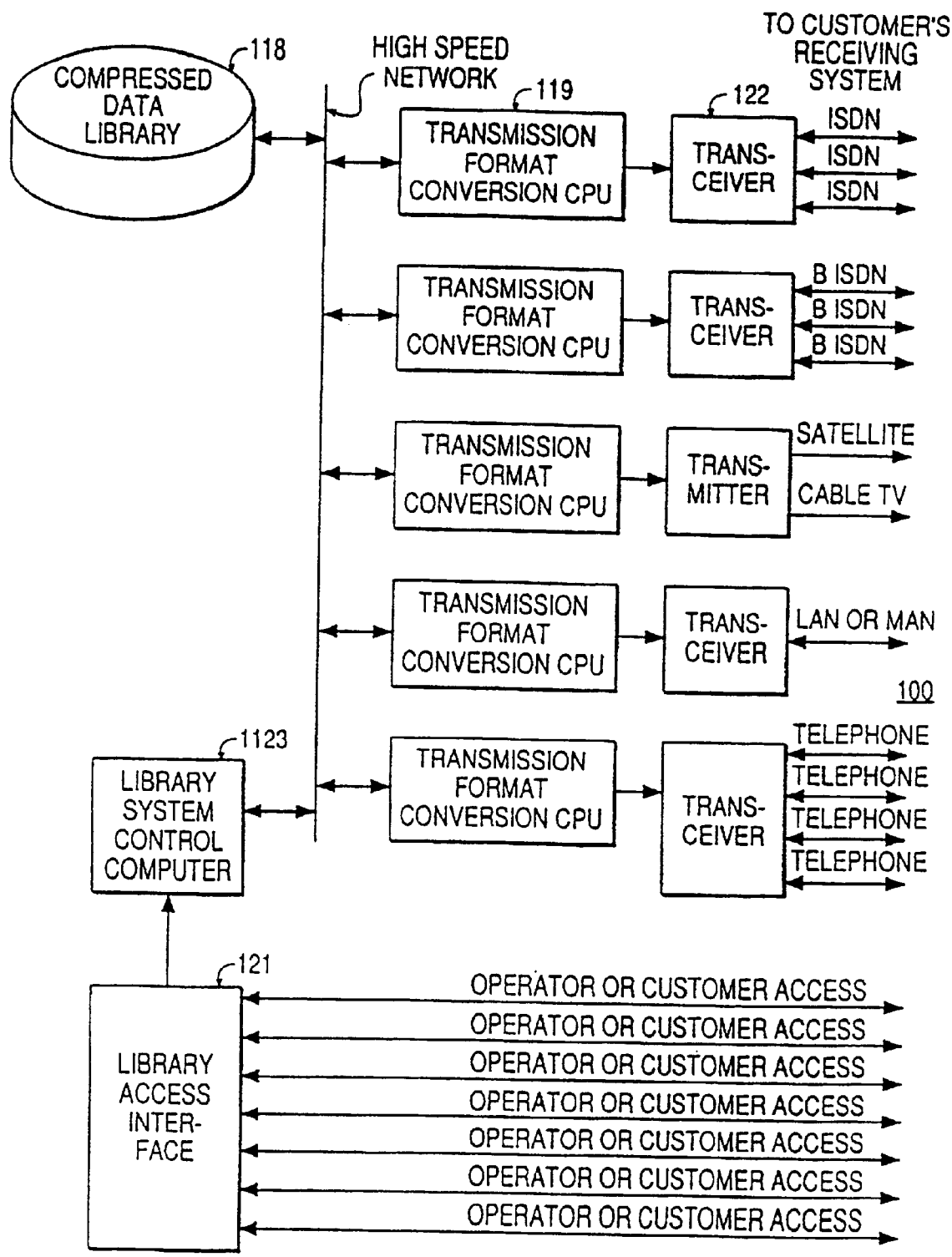

FIGS. 2a and 2b illustrate detailed block diagrams of preferred implementations of the transmission system 100 of the present invention. Transmission system 100 may either be located in one facility or may be spread over a plurality of facilities. A preferred embodiment of transmission system 100 may preferably include only some of the elements shown in FIGS. 2a and 2b.

Transmission system 100 of a preferred embodiment of the present invention preferably includes source material library means for temporary storage of items prior to conversion and storage in a compressed data library means. The items of information may include analog and digital audio and video information as well as physical objects such as books and records which require conversion to a compatible media type before converting, compressing and storing their audio and video data in the compressed data library means.

As shown in FIG. 2a, the source material library means included in transmission system 100 preferably includes a source material library 111. The source material library 111 may include different types of materials including television programs, movies, audio recordings, still pictures, files, books, computer tapes, computer disks, documents of various sorts, musical instruments, and other physical objects. These materials are converted to or recorded on a media format compatible to the digital and analog inputs of the system prior to being compressed and stored in a compressed data library 118. The different media formats preferably include digital or analog audio and video tapes, laser disks, film images, optical disks, magnetic disks, computer tapes, disks and, cartridges.

The source material library 111, according to a preferred embodiment of the present invention, may preferably include a single source material library or a plurality of source material libraries. If there are a plurality of source material libraries, they may be geographically located close together or may be located far apart. The plurality of source material libraries may communicate using methods and channels similar to the methods and channel types which libraries may employ for communication with the receiving system 200 of the user, or the source material libraries may communicate via any available method.

Prior to being made accessible to a user of the transmission and receiving system of the present invention, the item must be stored in at least one compressed data library 118, and given a unique identification code by identification encoder 112. Storage encoding, performed by identification encoder 112, aside form giving the item a unique identification code, optionally involves logging details about the item, called program notes, and assigning the item a popularity code. Storage encoding may be performed just prior to conversion of the item for transmission to reception system 200, at any time after starting the conversion process, or after storing the item in the compressed data library 118.

In a preferred embodiment of the present invention, the method of encoding the information involves assigning a unique identification code and a file address to the item, assigning a popularity code, and inputting the program notes. This process is identical for any of the different media types stored in the source material library 111.

The transmission system 100 of the present invention also preferably includes conversion means 113 for placing the items from source material library 111 into a predetermined format as formatted data. In the preferred embodiment, after identification encoding is performed by identification encoder 112, the retrieved information is placed into a predetermined format as formatted data by the converter 113. The items stored in source material library 111 and encoded by identification encoder 112 may be in either analog or digital form. Converter 113 therefore includes analog input receiver 127 and digital input receiver 124. If items have only one format, only one type of input receiver 124 or 127 is necessary.

When the information from identification encoder 112 is digital, the digital signal is input to the digital input receiver 124 where it is converted to a proper voltage. A formatter 125 sets the correct bit rates and encodes into least significant bit (1sb) first pulse code modulated (pcm) data. Formatter 125 includes digital audio formatter 125a and digital video formatter 125b. The digital audio information is input into a digital audio formatter 125a and the digital video information, if any, is input into digital video formatter 125b. Formatter 125 outputs the data in a predetermined format.

When the retrieved information from identification encoder 112 is analog, the information is input to an analog-to-digital converter 123 to convert the analog data of the retrieved information into a series of digital data bytes. Converter 123 preferably forms the digital data bytes into the same format as the output of formatter 125.

Converter 123 preferably includes an analog audio converter 123a and an analog video converter 123b. The analog audio converter 123a preferably converts the retrieved audio signal into pcm data samples at a fixed sampling rate. The analog video converter 123b preferably converts the analog video information, retrieved from identification encoder 123, into pcm data also at fixed sampling rates.

If the retrieved information being converted contains only audio information, then the audio signal is fed to the appropriate digital audio input or analog audio input. When the retrieved information contains both audio and video information, the audio and video signals are passed simultaneously to the audio and video converter inputs. Synchronization between the audio and video data can be maintained in this way.

If, for example, the retrieved information to be converted from the source material library 111 is a motion picture film, the picture frames in the film are passed through a digital telecine device to the digital input receiver 124. Format conversion is then preferably performed by digital video formatter 125b. Accompanying audio information is passed through an optical or magnetic digital playback device. This device is connected to digital audio formatter 125a.

In some cases, such as inter-library transfers, incoming materials may be in a previously compressed form so that there is no need to perform compression by precompression processor 115 and compressors 128 and 129. In such a case, retrieved items are passed directly from identification encoder 112 to the compressed data formatter 117. The item database records, such as the program notes which may also be input from another system, to the compressed data formatting section 117, where this data, if necessary, is reformatted to make it compatible with the material stored in compressed data library 118. Such material may be received in the form of digital tapes or via existing communication channels and may preferably input directly to a short term storage 117' in the compressed data formatting section 117.

The transmission system 100 of the present invention also preferably includes ordering means for placing the formatted information into a sequence of addressable data blocks. As shown in FIG. 2a, the ordering means in the preferred embodiment includes time encoder 114. After the retrieved information is converted and formatted by the converter 113, the information may be time encoded by the time encoder 114. Time encoder 114 places the blocks of converted formatted information from converter 113 into a group of addressable blocks. The preferred addressing scheme employs time encoding. Time encoding allows realignment of the audio and video information in the compressed data formatting section 117 after separate audio and video compression processing by precompression processor 115 and compressor 116.

The converted formatted information of the requested material is then preferably in the form of a series of digital data bytes which represent frames of video data and samples of the audio data. A preferred relationship of the audio and video bytes to each other is shown in FIG. 8. Incoming signals are input and converted in sequence, starting with the first and ending with the last frame of the video data, and starting with the first and ending with the last sample of the audio data. Time encoding by time encoder 114 is achieved by assigning relative time markers to the audio and video data as it passes from the converter 113 through the time encoder 114 to the precompression processor 115. Realignment of audio and video data, system addressing of particular data bytes, and user addressing of particular portions of items are all made possible through time encoding.

Through the use of the address of an item and its frame number it is possible to address any particular block of audio or video data desired. From here, further addressing down to the individual byte is possible. Frames and groups of frames may preferably be further broken down, as necessary to the individual bytes and bits, as required for certain processing within the system.

User and system addressing requirements dictate the level of granularity available to any particular section of the system. Users are able to move through data in various modes, thus moving through frame addresses at various rates. For example, a user may desire to listen to a particular song. They may preferably enter the song number either when requesting the item from the compressed data library 118 and only have that song sent to their receiving system 200 or they may preferably select that particular song from the items buffered in their receiving system 200. Internal to the system, the song is associated with a starting frame number, which was indexed by the system operator via the storage encoding process. The system item database may contain information records for individual frames or groups of frames. These can represent still frames, chapters, songs, book pages, etc. The frames are a subset of, and are contained within, the items stored in the compressed data library 118. Time encoding by time encoder 114 makes items and subsets of items retrievable and addressable throughout the transmission system 100. Time encoding enables subsequent compression of the information to be improved because data reduction processes may be performed in the time dimension. This is described in greater detail below.

The transmission system 100 of the present invention also preferably includes data compression means for compressing the formatted and sequenced data. The sequence of addressable data blocks which was time encoded and output by time encoder 114 is preferably sent to precompression processor 115. The data arriving from time encoder 114 may be at various frame rates and of various formats. Precompression processor 115 preferably includes audio precompressor 115a and video precompressor 115b.

Video precompression processor 115b buffers incoming video data and converts the aspect ratio and frame rate of the data, as required by compression processor 116. The frame buffer 131 of video precompression processor 115b holds all incoming data until the data is compressed by the data compressor 116. The incoming video data is processed for sample rate optimization, aspect ratio fitting and buffered in buffer 130 for compression processing by the video precompression processor 115b.

Video precompression processor 115b processes the incoming video data so that it fits into the aspect ratio of the transmission and receiving system of the present invention. When incoming material with a different aspect ratio than the aspect ratio of-the system is selected, a chosen background is preferably placed around the inactive region of the video information. In this way, no data is lost to differences in the aspect ratio between incoming material, and the converted and compressed data stored in the transmission system 100. Images resulting from a different aspect ratio may have an inactive region where background information is contained, or may be converted into a best fit arrangement. Output from the video precompression processor 115b is stored in the frame buffer 131, which is dual ported and is directly addressable by video compressor 129.

The incoming audio data is processed for sample rate and word length optimization and is then buffered in buffer 130 for compression processing by the audio precompression processor 115a. Audio precompression processor 115a may preferably transcode incoming audio information, as required, to create the optimum sample rate and word lengths for compression processing. The output of the audio precompression processor 115a is a constant sample rate signal of a fixed word length which is buffered in frame buffer 130. The frame buffer 130 is dual ported and is directly addressable by audio compressor 128. Blocking the audio data into frames at audio precompression processor 115a makes it possible to work with the audio data as addressable packets of information.

Once precompression processing is finished, the frames are compressed by the data compressor 116. Compressor 116 preferably comprises an audio data compressor 128 and a video data compressor 129. The benefits of data compression performed by data compressor 116 are shortened transmission time, faster access time, greater storage capacity, and smaller storage space requirements. Compression processing performed by compressors 128 and 129 requires multiple samples of data to perform optimum compression. Audio and video information is preferably converted into blocks of data organized in groups for compression processing by audio compressor 128 and video compressor 129, respectively. These blocks are organized as frames, and a number of frames are contained respectively in the buffers 130 and 131. By analyzing a series of frames it is possible to optimize the compression process.

Audio data is preferably compressed by audio compressor 128 by application of an adaptive differential pulse code modulation (ADPCM) process to the audio data. This compression process, which may be implemented by the apt-x 100 digital audio compression system, is manufactured by Audio Processing Technology (APT). Audio compression ratios of 8× or greater are achieved with the APT system.

Compression by compressor 116 may be performed on a group of 24 video frames may preferably be passed in sequence to the frame buffer 130 of the video precompression processor 115b where they are analyzed by video compressor 129 which performs data reduction processing on the video data. Video compression is preferably performed by video compressor 129. Video compression is achieved by the use of processors running algorithms designed to provide the greatest amount of data compression possible. Video data compression preferably involves applying two processes: a discrete cosine transform, and motion compensation. This process is described in "A Chip Set Core of Image Compression", by Artieri and Colavin. Multiple frames of video data may preferably be analyzed for patterns in the horizontal (H), vertical (V), diagonal (zigzag) and time.(Z) axis. By finding repetition in the video data, redundancy may be removed and the video data may be compressed with a minimal loss of information.

In accordance with a preferred embodiment of the present invention, the transmission system 100 may further comprise compressed data storing means, coupled to the compression means, for storing as a file the compressed sequenced data with the unique identification code received from the data compression means. After compression processing by compressor 116, the compressed audio and video data is preferably formatted and placed into a single file by the compressed data storage means 117. The file may contain the compressed audio and/or video data, time markers, and the program notes. The file is addressable through the unique identification code assigned to the data by the identification encoder 112.

Further, according to the present invention, the transmission system preferably includes compressed data library means for separately storing composite formatted data blocks for each of the files. The compressed data storage means preferably includes compressed data library 118, as shown in FIG. 2b. After the data is processed into a file by the compressed data storage means 117, it is preferably stored in a compressed data library 118. In a preferred embodiment, compressed data library 118 is a network of mass storage devices connected together via a high speed network. Access to any of the files stored in compressed data library 118 is available from multiple reception systems 200 connected to the transmission and receiving system.

Stored items are preferably accessed in compressed data library 118 through a unique address code. The unique address code is a file address for uniquely identifying the compressed data items stored in the compressed data library section of a library system. This file address, combined with the frame number, and the library system address allow for complete addressability of all items stored in one or more compressed data libraries 118. Compressed data library addresses along with receiving system addresses are used to form a completely unique address for distribution system control.

The unique address code is an address assigned to the item by the system operator during storage encoding, which is preferably done prior to long term storage in the compressed data library 118. In a preferred embodiment, the unique address code is used for requesting and accessing information and items throughout the transmission and receiving system. The unique address code makes access to the requested data possible.

The storage encoding process performed by encoder 112 also allows entry of item notes and production credits. Production credits may include the title, names of the creators of the item such as the producer, director, actors, etc. Other details regarding the item which may be of interest and which may make the items more accessible are kept in an item database.

Item addresses are mapped to item names by identification encoder 112 and may preferably be used as an alternative method of accessing items. The item names are easier to remember, thus making user access more intuitive by using item names. The storage encoding entry process performed in identification encoder 112 operates a program which updates a master item database containing facts regarding items in the compressed data library system. The storage encoding process may be run by the system operator whereby the system operator accesses the master item database to track and describe items stored in one or more compressed data libraries. The names and other facts in the item database may preferably be updated at any time via the storage encoding process. Changes made to the master item database may be periodically sent to the remote order processing and item database 300.

As described in more detail later, a user may preferably access an item via its unique identification code, via its title or the user may use other known facts for accessing an item. The user may access items in the compressed data library 118 direct using the unique address code or the user may obtain access via the remote order processing and item database 300. Indirect access via the remote order processing and item database 300 is possible using, for example, a synthesized voice system, a query type of computer program interface, or customer assistance operators. In addition to providing interactive access to the remote order processing and item database 300, a catalog listing some or all available titles may also preferably be published. With a published catalog, users may obtain the unique address code for an item very easily thereby allowing for retrieval from the compressed data library 118 without any help from an interactive system.

To achieve user access via an interactive system, facts about the items may be kept in files as a part of the items or the facts may be kept separately, for example, by systems which only to inform users of the available items and take orders. For example, in systems which have portions split in separate locations, the facts about the items may be separated from the items themselves and stored in separate files. A system of this type can distribute user orders to other portions of the transmission and receiving system for ultimate distribution to the requesting user. Further, to support a plurality of users, multiple versions of the item database may preferably reside either on multiple database servers, in catalogs, or on other computer systems.

The item database master may reside in the system control computer 1123 where may be updated and kept current to the contents of the compressed data library 118. The data stored in the item database master may be accessed by users via application programs, running on the system control computer 1123, and on the reception system 200 of the user. Users may connect to the item database via any available telecommunication channels. Copies of the item database master may be updated and informed of new entries into compressed data library 118 at periodic intervals determined by the system manager.

Other copies of the item database master may also be made available to users from the remote order processing and item database 300 which batch processes and downloads user requests to the control computer 1123 of the compressed data library 118 via standard telecommunications or high speed communication channel. Moreover, multiple remote order processing and item database 300 sites make it possible for more locations to process orders than there are library facilities, and thus make order processing more efficient.

Preferably, access of a requested item via the remote order processing and item database 300 operates as follows. If the user does not know the title of the desired item, he or she may request the item by naming other unique facts related to the item. For example, a user would be able to access an item about Tibetan Medicine by asking for all items which include information about "Tibet" and include information about "Medicine." The remote order processing and item database 300 would then be searched for all records matching this request. If there is more than one item with a match, each of the names of the matching items are preferably indicated to the user. The user then selects the item or items that he or she desires. Upon selection and confirmation, by the user, a request for transmission of a particular item or items is sent to the distribution manager program of the system control computer 1123. The request contains the address of the user, the address of the item, and optionally includes specific frame numbers, and a desired viewing time of the item.

The storage encoding process performed by identification encoder 112 also allows entry of a popularity code. The popularity code is preferably assigned on the basis of how often the corresponding item is expected to be requested from the compressed data library 118. This popularity code can be used to determine the most appropriate form of media for storage of the compressed data in a mixed media system. Mixed media systems are preferably employed as more cost effective storage in very large compressed data libraries 118. Once assigned, the popularity code may be dynamically updated, by factoring item usage against system usage. Thus, stored items are dynamically moved to the most appropriate media over their life in the compressed data library 118. If a particular item stored in compressed data library 118 is retrieved frequently by users, storage in compressed data library 118 is preferably on higher speed, more reliable, and probably more expensive media. Such media includes Winchester and magneto-optical disks.

If an item stored in compressed data library 118 is retrieved less frequently, it may be stored in the compressed data library 118 on a digital cassette tape. Examples of such cassette tapes are a Honeywell RSS-600 (Honeywell Inc. Minneapolis Minn.), Summus JukeBoxFilm and tape library (Summus Computer Systems, Houston, Tex. 800-255-9638), or equivalent cassette tapes. All items stored in the compressed data library 118 are on line and are connected to the high speed network. Thus, they may be readily accessed.

Instead of using a remote order processing and item database 300, the compressed data library 118 may include the program notes which were input by the system operator. The program notes may preferably include the title of the item stored in the compressed data library 118, chapter or song titles, running times, credits, the producer of the item, acting and production credits, etc. The program notes of an item stored in the compressed data library 118 may be thus contained within the compressed data file formed in the compressed data formatter 117.

In some cases, where multiple compressed data libraries 118 are organized, the popularity code may dictate distribution of a particular item to multiple distribution systems. In such cases, a copy of the compressed data is sent to another library and the other library can then distribute the compressed data to users concurrently with the original compressed data library 118.

The compressed data library 118 is composed of a network of storage devices connected through a High Performance Parallel Interface (HPPI) Super Controller (available from Maximum Strategy Inc., San Jose, Calif.). Therefore, multiple communication controllers may preferably access the large quantity of data stored in compressed data library 118 at very high speeds for transfer to a reception system 200 of a user upon request. For more details on this configuration see Ohrenstein, "Supercomputers Seek High Throughput and Expandable Storage", Computer Technology Review, pp. 33–39 April 1990.

The use of an HPPI controller allows file placement onto multiple mass storage devices of the compressed data library 118 with a minimum of overhead. Database management software controls the location and tracking of the compressed data library 118 which can be located across multiple clusters of file servers connected together by one or more high speed networks over multiple systems.

The transmission system 100 of the present invention may also preferably include library access/interface means for receiving transmission requests to transmit items and for retrieving formatted data blocks stored in the compressed data library 118 corresponding to the requests from users. The compressed audio and/or video data blocks, along with any of the information about the item stored in the compressed data library 118 may be accessed via library access interface 121. The library access interface 121 receives transmission requests either directly from the users or indirectly by remote order processing and item database 300.

The transmission format means 119 receives the request and retrieves the composite formatted data block of the requested item stored in compressed data library 118 and converts the compressed formatted data block into a format suitable for transmission. The requested item is then sent to the user via the transmitter 122 or directly via interface 121.

In a preferred embodiment of the present invention, customer access of an item stored in compressed data library 118 via the library access interface 121 may be performed in various ways. The methods of requesting a stored item are analogous to making an airline reservation or transferring funds between bank accounts Just as there are different methods available for these processes it is desirable to have several ordering methods available to the users of the system of the present invention. For example, telephone tone decoders and voice response hardware may be employed. Additionally, operator assisted service or user terminal interfaces may be used.

Customer access via telephone tone decoders and voice response hardware is completely electronic and may preferably be performed between a system user and a computer order entry system. The user may obtain help in ordering an item from a computer synthesized voice. With such an access method, the user will normally be accessing a dynamic catalog to assist them. Confirmation of selections and pricing information may preferably be given to the user prior to completion of the transaction.

This process of access, performed by remote order processing and item database configuration 300, shown in FIG. 1c, preferably includes the following steps, shown in flowchart 3000 of FIG. 3. First, the user calls the system access number (step 3010). Upon successfully dialing the system access number, the user receives instructions from the system (step 3020). The instructions may preferably include steps the user must take in order to place an order. Preferably, the instructions may be bypassed by the experienced user who knows how to place an order.

The user then enters a customer ID code by which the system accesses the user's account, and indicates to the system that the user is a subscriber of the system (step 3030). In response to the user entering his ID code in step 3030 the system confirms whether the user is in good standing (step 3040). If the user is in good standing, the system queues the user to input his request (step 3050).

The user request may preferably be made from a catalog sent to each of the subscribers of the system. The user will preferably identify his choice and enter the corresponding identification code of the item (step 3060). The system then preferably confirms the selection that the user has made and informs the user of the price of the selection (step 3070).

The user then indicates whether the confirmation performed in step 3070 is correct (step 3080). If the confirmation performed in step 3070 is correct, the user so indicates and then inputs a desired delivery time and delivery location (step 3090).

If the confirmation performed in step 3070 does not result in the selection desired by the user, the user re-inputs the item identification code in step 3060 and the confirmation steps 3070 and 3080 are repeated. Therefore, proper selection of the selected item is insured. Once there is confirmation, the user enters the playback time and destination in step 3090.

The user then preferably confirms that the order is correct (step 3100). The confirmation performed in step 3100 includes confirmation of the entire transaction including the selected item, the selected time of playback, and the location of playback The transaction is then completed and the request is placed on a transmission queue at the appropriate compressed data library 118 (step 3110).

Access by the users via operator assisted service includes telephone operators who answer calls from the users. The operators can sign up new customers, take orders, and help with any billing problems. The operators will preferably have computer terminals which give them access to account information and available program information. Operators can also assist a user who does not know a title by looking up information stored in files which may contain the program notes, as described above. Once the chosen program is identified, the operator informs the user of the price. After the user confirms the order, the user indicates the desired delivery time and destination. The operator then enters the user request into the system. The request is placed in the transmission queue.

Access by a user terminal interface method provides the user with access from various terminals including personal computers, and specialized interfaces built into the reception system 200 for the user. Such access allows a user to do a search of available programs from a computer screen. This process involves the steps 4000 shown in FIG. 4.

Figure 4:
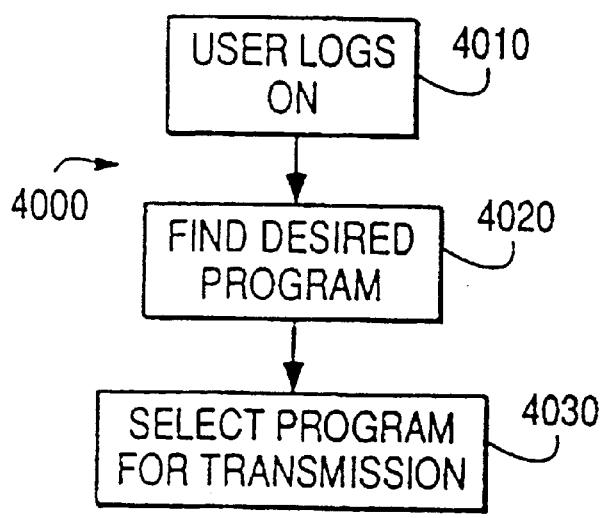
FIG. 4 is a flowchart of a preferred method of user request via a user interface of the present invention.

FIG. 4 is a flowchart of a preferred method of user request via a user interface of the present invention. In the preferred method of FIG. 4, the user first logs onto the user terminal interface (step 4010). After the user logs on, the user may preferably select a desired item by searching the database of available titles in the library system control computer 1123 or any remote order processing and item database 300 (step 4020). The search may preferably be performed using the database containing the program notes, described above with respect to FIGS. 2a and 2b. It is possible to process orders and operate a database of available titles at multiple locations remote of the source material library 111. Users and order processing operators may preferably access such remote systems and may place transmission requests from these systems. Orders placed on these systems will be processed and distributed to the appropriate libraries. After the desired item is found, the user selects the item for transmission at a specific time and location (step 4030).

To complete an order, the remote order processing and item database 300 preferably connects to the compressed data library 118 of choice via the library access interface 121 and communicates with the library system control computer 1123. Preferably the user's account ID, identification of the item for transmission and the chosen destination for the item are communicated. Through employment of distributed order processing systems of this type many orders may be processed with minimal library overhead.

All transmission requests from the access methods are placed into a transmission queue managed by the library system control computer 1123. This queue is managed by a program that controls the distribution of the requested items to the reception system 200 of the user. The queue manager program also operates in the system control computer and keeps track of the user ID, the chosen program and price, the user channel type, the number of requests for a given program, the latest delivery time, and the compressed data library media type (for example, high speed or low speed). From this information, the queue manager program makes best use of the available distribution channels and media for efficient transmission and storage of the requested items.

The queue manager program also manages the file transmission process for multiple requests for a single file, stored in the compressed data library 118. During a given time period, the queue manager program will optimize access to the compressed data library 118, wherever possible it will place the data on multiple outputs for simultaneous transmission to more than one requesting user.

The conversion performed by transmission data converter 119 encodes the data for the transmission channel. The transmission data converter transfers the desired segments of data from the compressed data library 118 onto the communication channel which is used to deliver the data to the reception system 200.

The transmission system 100 of the present invention preferably further includes transmitter means 122, coupled to the compressed data library 118, for sending at least a portion of a specific file to at least one remote location. The transmission and receiving system of the present invention preferably operates with any available communication channels. Each channel type is accessed through the use of a communications adaptor board or processor connecting the data processed in the transmission format converter 119 to the transmission channel.

A preferred embodiment of the present invention also includes means by which to access users via common access lines. These may include standard telephone, ISDN or B-ISDN, microwave, DBS, cable television systems, MAN, high speed modems, or communication couplers. Metropolitan Area Networks (MANS) which are common carrier or private communication channels are designed to link sites in a region. MANs are described by Morreale and Campbell in "Metropolitan-area networks" (IEEE Spectrum, May 1990 pp. 40–42). The communication lines are used to transmit the compressed data at rates up to, typically, 10 Mb/sec.

In order to serve a multitude of channel types, a preferred embodiment of the present invention includes a multitude of output ports of each type connected to one or more computers on the transmission and receiving system. The management of transmission is then distributed. That is, the computer controlling the transmission queue tells the transmission encoding computer its task and then the task is executed by the transmission encoding computer, independent of the transmission queue computer. The transmission queue computer provides the data for transmission by file server which also distributes to other transmitters located in the same or other transmission encoding computers.

Figure 5:
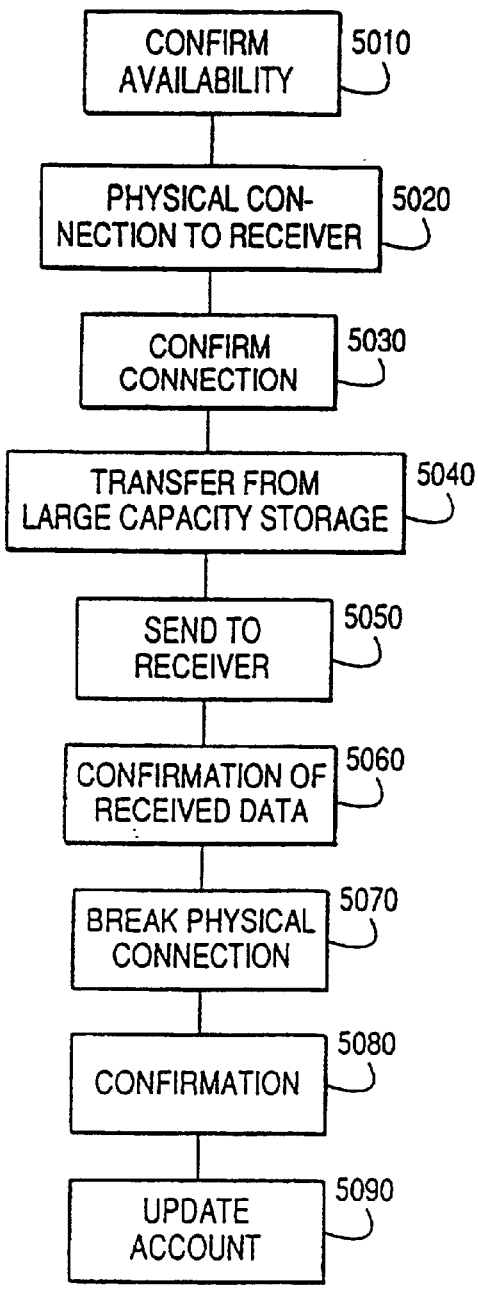
FIG. 5 is a flowchart of a preferred method of implementing a queue manager program of the present invention.

FIG. 5 is a flowchart of a preferred method of implementing a queue manager program of the present invention. The queue manager program, in the distribution process, preferably confirms availability of an item from the compressed data library 118 and logically connects the item stored in compressed data library 118 to the communications controller, illustrated in FIG. 2a (step 5010). After availability is confirmed in step 5010, the data awaits transmission by the transmitter 122.

After availability is confirmed in step 5010, the communications controller preferably makes the physical connection to the reception system 200 of the user (step 5020). This is normally done by dialing the receiving device of the user. The reception system 200 preferably answers the incoming call and confirms the connection (step 5030).

Once connected to the reception system 200, in steps 5020 5030, the data stored in compressed data library 118 is preferably transferred in data blocks from the compressed data library 118 to the communications controller (step 5040). The data blocks are buffered by the communications controller. The buffered data is sent down the communications channel to the reception system 200 by transmitter 122 (step 5050).

The transmitter 122 places the formatted data onto the communications channel. This is an electrical conversion section and the output depends upon the chosen communication path. The signal is sent to the reception system 200 in either a two way or a one way communication process. In a standard telephone connection, the transmitter 122 is preferably a modem. When using an ISDN channel, the transmitter 122 is preferably a data coupler.

In a preferred embodiment of the present invention, many forms of communication channels may be employed. Distribution of information is by common carrier communication channels whenever possible. These channels include common telephone service, ISDN and Broadband ISDN, DBS, cable television systems, microwave, and MAN.

In order that reception is performed efficiently, the reception system 200 confirms reception of the initial data block before receiving the remaining data blocks whenever possible (step 5060). After all data blocks have been received and reception is confirmed, the communications controller breaks the physical connection to the reception system 200 (step 5070). Then, confirmation of the transmission is sent to the queue manager (step 5080). Finally, the queue manager updates the list and sends the information to the billing program, which updates the account of the user (step 5090).

When item distribution occurs through a broadcasting method such as a communications satellite, the process is one way, with ongoing reception not being confirmed by the reception system 200. In these situations, some further redundancy is included by transmission formatter 122 with the data blocks for error correction processing to be performed in the reception system 200. In such one way communication situations, the queue manager program running in library system control computer 1123 confirm reception, via telephone line connection for example, to the reception system 200 after distribution. This should occur prior to updating the user's account and the dispatch lists.

The real time output signals are output to a playback system such as an audio amplifier and/or television. This output may also be sent to an audio/video recorder for more permanent storage. Moreover, in the preferred embodiment only non-copy protected data can be recorded on an audio/video recorder. Any material which is copy protected will be scrambled at the video output in a way which makes it viewable on a standard audio/video receiver but does not allow for recording of the material.

The reception system 200 has playback controls similar to the controls available on a standard audio/video recorder. These include: play, fast forward, rewind, stop, pause, and play slow. Since items are preferably stored on random access media, the fast forward and rewinding functions are simulations of the actual events which occur on a standard audio/video recorder. Frames do not tear as on an audio/video recorder, but in fast play modes they go by very quickly.

The library access interface 121 in the reception system 200 preferably includes a title window where a list of available titles are alphabetically listed. This window has two modes: local listing of material contained within the library system control computer 1123, and library listing for all available titles which may be received from the available, remotely accessible libraries. The titles listed in this window are sent from the database on the library system control computer 1123 or the remote order processing and item database 300.

The system may also preferably include dispatching control software which receives input from the remote order processing and item database 300 and sends distribution requests to the distribution systems. In instances where not all items are contained in each of the compressed data libraries 118, the dispatching software will keep a list of the available titles in a particular compressed data library 118. The dispatch software may also preferably coordinate network traffic, source material library 111 utilization, source material library 111 contents, and connection costs. By proper factoring of these variables, efficient use of the available distribution channels may be achieved.

Figure 6:
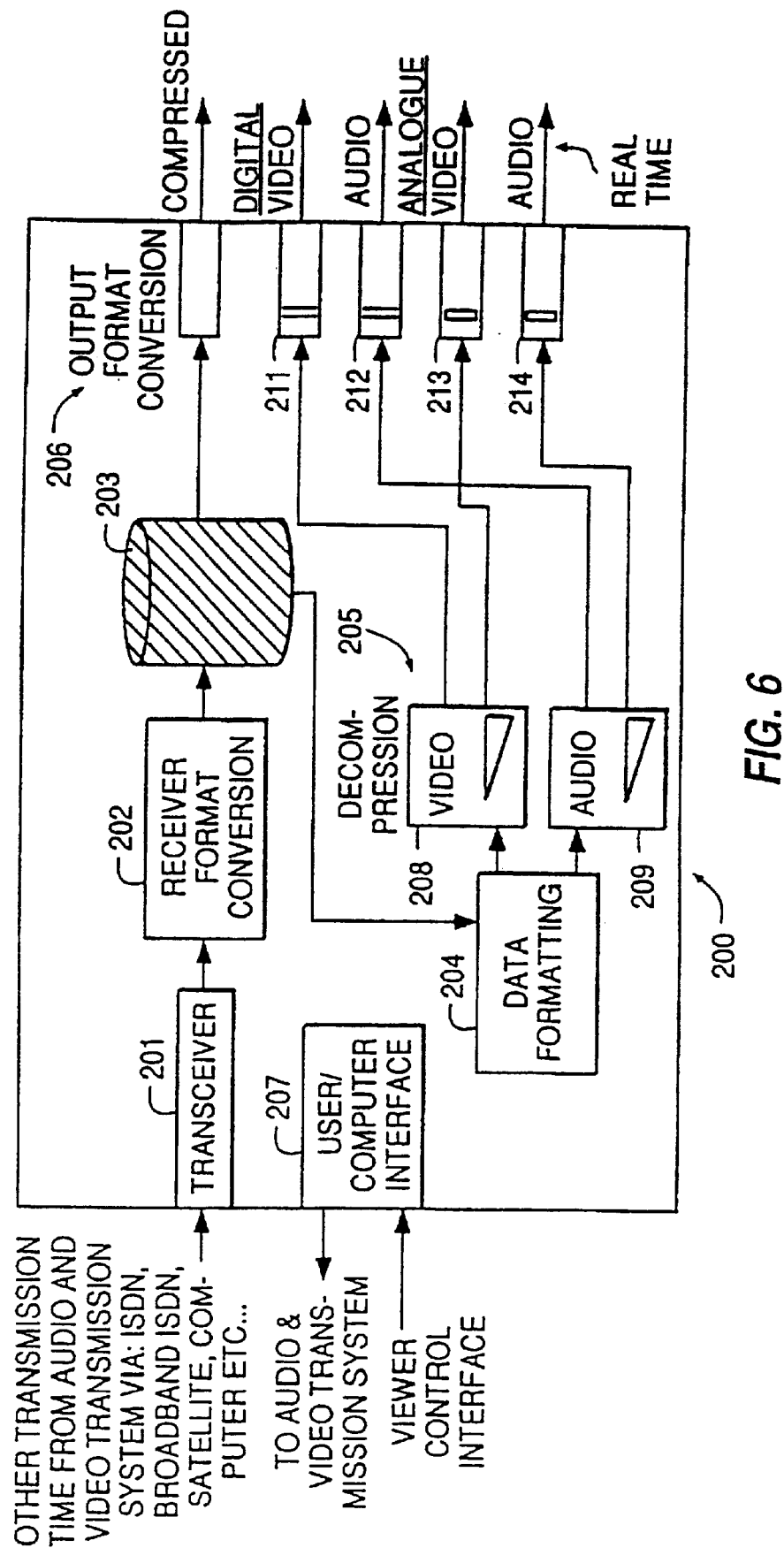
FIG. 6 is a block diagram of a preferred implementation of the receiving system of the present invention.

FIG. 6 illustrates a block diagram of a preferred implementation of the reception system 200 according to the present invention. The reception system 200 is responsive to user requests for information stored in source material library 111. The reception system 200 includes transceiver 201 which receives the audio and/or video information transmitted by transmitter 122 of the transmission system 100. The transceiver 201 automatically receives the information from the transmitter 122 as compressed formatted data blocks.

The transceiver 201 is preferably connected to receiver format converter 202. The receiver format converter 202 converts the compressed formatted data blocks into a format suitable for playback by the user in real time.

In the reception system 200 of the present invention, the user may want to play back the requested item from the source material library 111 at a time later than when initially requested. If that is the case, the compressed formatted data blocks from receiver format converter 202 are stored in storage 203. Storage 203 allows for temporary storage of the requested item until playback is requested.

When playback is requested, the compressed formatted data blocks are sent to data formatter 204. Data formatter 204 processes the compressed formatted data blocks and distinguishes audio information from video information.

The separated audio and video information are respectively decompressed by audio decompressor 209 and video decompressor 208. The decompressed video data is then sent simultaneously to converter 206 including digital video output converter 211 and analog video output converter 213. The decompressed audio data is sent simultaneously to digital audio output converter 212 and analog audio output converter 214. The outputs from converters 211–214 are produced in real time.

The real time output signals are output to a playback system such as a TV or audio amplifier. They may also be sent to an audio/video recorder of the user. By using the reception system 200 of the present invention, the user may utilize the stop, pause, and multiple viewing functions of the receiving device. Moreover, in a preferred embodiment of the present invention, the output format converters may be connected to a recorder which enables the user to record the requested item for future multiple playbacks.

Figure 7:
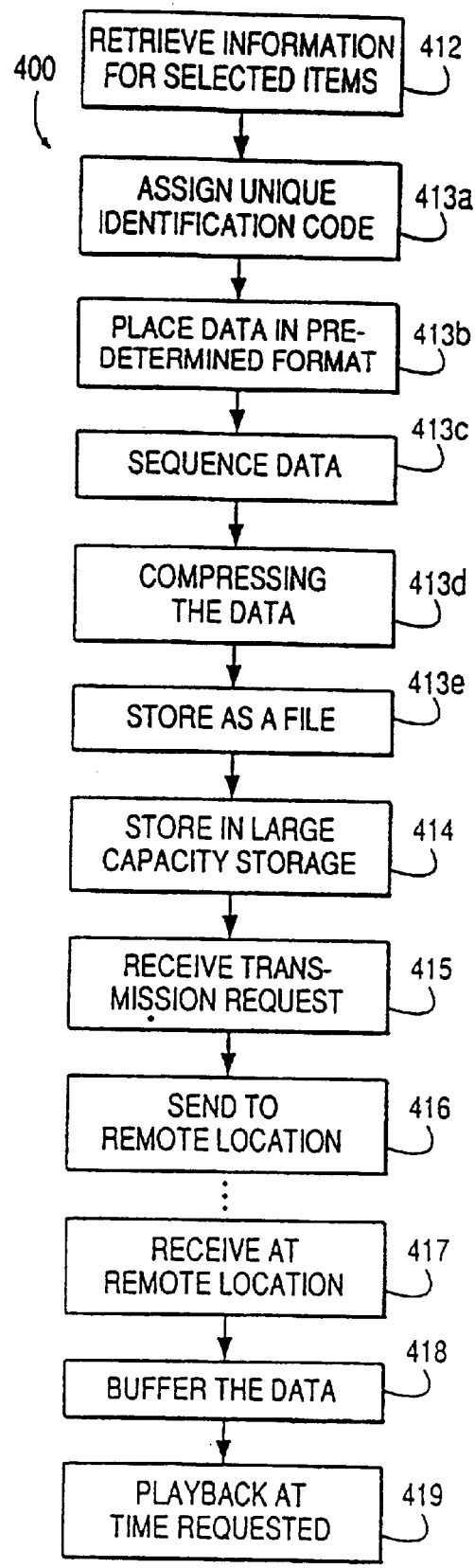
FIG. 7 is a flowchart of a preferred method of distribution of the present invention.

FIG. 7 is a flow chart 400 of a preferred method of distribution of the present invention. The distribution method is preferably responsive to requests identifying information to be sent from the transmission system 100 to remote locations. Method 400 assumes that the items have already been stored in compressed data library 118.

As illustrated in FIG. 7, the first step of the distribution method 400 involves retrieving the information for selected items in the source material library ill, upon a request by a user of the distribution system (step 412). This is analogous to taking books off of a shelf at the local public library after the person has decided that he or she would like to read them.

After the information for the selected items is retrieved in step 412, the distribution method 400 of the present invention further comprises the step of processing the information for efficient transfer (step 413). The processing performed in step 413 preferably includes assigning a unique identification code to the retrieved information performed by identification encoder 112, shown and described with respect to FIG. 2a (step 413a). The processing also preferably includes placing the retrieved information into a predetermined format as formatted data by converter 113 (step 413b), and placing the formatted data into a sequence of addressable data blocks by ordering means 114 (step 413c).

Processing step 413 also includes compressing the formatted and sequenced data performed by data compressor 116 (step 413d), and storing as a file the compressed sequenced data received from the data compression means with the unique identification assigned by the identification encoding means (step 413e).

After the information is processed for efficient transfer, in substeps 413a–e of step 413, the distribution method 400 of the present invention preferably includes the step of storing the processed information is stored in a compressed data library (step 414). Preferably, the compressed data library is analogous to compressed data library 118, described with respect to FIG. 2a.

After the information is stored in a compressed data library 118, the transmission and receiving system preferably waits to receive a transmission request (step 415). Upon receiving a transmission request, from transmission system 100, the compressed formatted data is preferably converted for output to a reception system 200, selected by the user. The information is preferably transmitted over an existing communication channel to a reception system 200, and is received by that system (step 417). When the information is received in step 417, it is preferably formatted the particular type of reception system 200 to which the information is sent.

The received information is preferably buffered (step 418) by a storage means analogous to element 203 shown in FIG. 3. The information is preferably buffered so that it may be stored by the user for possible future viewings. The requested information is then played back to the reception system 200 of the user at the time requested by the user (step 419).

Figure 8E:
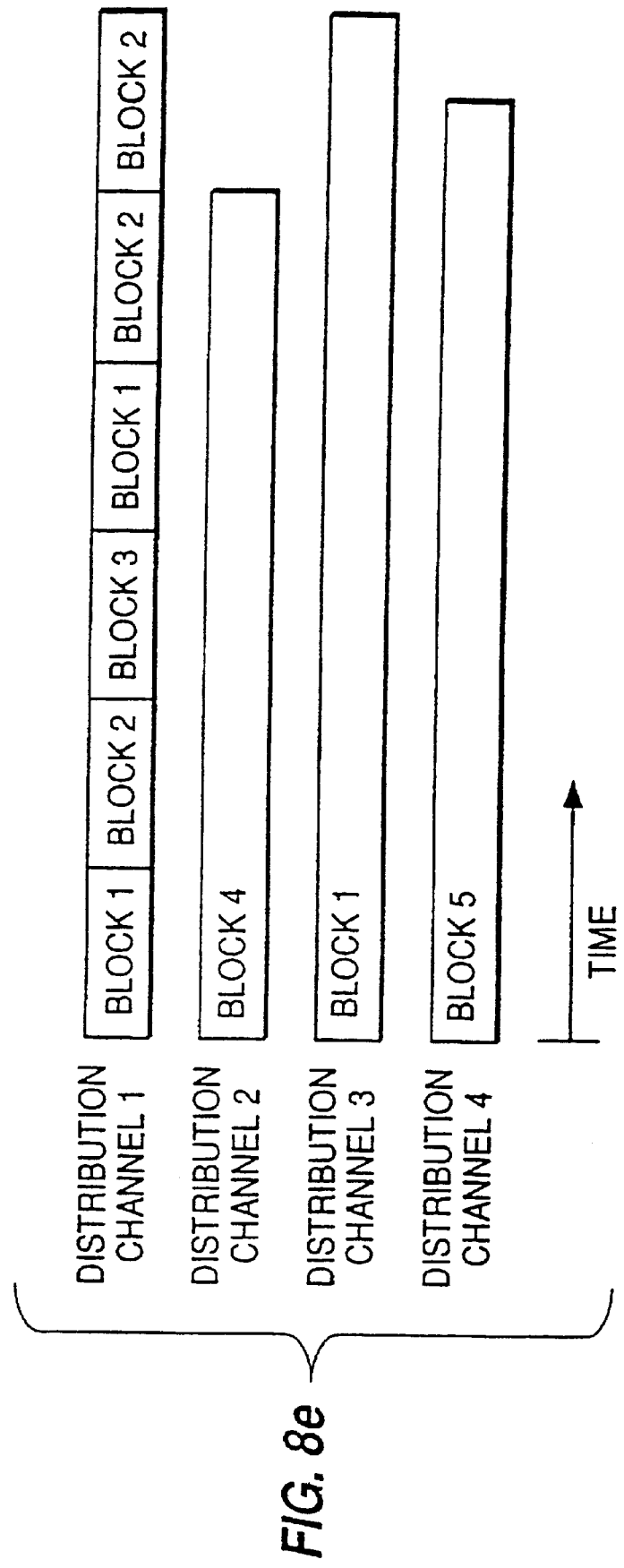

FIGS. 8a–8e are block diagrams of preferred implementations of data structures and data blocking for items in the audio and video distribution system. FIG. 8a shows the block structure of video data where a video frame 812 is composed of a plurality of video samples 811, and a second of video 813 is composed of a plurality of video frames 812.

FIG. 8b shows the block structure of audio data where an audio data frame 822 is composed of a plurality of audio samples 821, and a second of audio 823 is composed of a plurality of audio data frames 822. FIG. 8c shows the block structure of a data frame 832 composed of a plurality of data bytes 831. The combination of the audio frames 812, video frames 822, and data frames 832 comprise the elements of a single item. FIG. 8d shows a block representation of for three illustrative items which may be stored in the source material library 111. Each of items 1–3 contains its own arrangement of video frames 812, audio frames 822, and data frames 832.

FIG. 8e shows methods of distribution to reception systems 200 with both multiplexed and non-multiplexed signal paths, both addressed and non-addressed blocks of items. A block of an item may be an entire item or, alternatively, may be only a portion of an item, as selected by a user. Further, the blocks may composed of either compressed, partially compressed, or fully decompressed data, as required by the configuration of the reception system 200.

As shown in FIG. 8e, the same block, for example, block 1, may be simultaneously transmitted over different distribution channels. The blocks when transmitted over one of the distribution channels may have receiver addresses appended to the blocks or the reception system 200 may have been preconfigured to receive the blocks comprising data frames for particular items from the active distribution channel.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A transmission system responsive to input from a user positioned at an accessing location for transmitting information to a premises selected by the user, the transmission system comprising:
    a plurality of libraries for storing items containing information;
    identification encoding means for retrieving the information in the items from the plurality of libraries and for assigning a unique identification code to the retrieved information;
    conversion means, coupled to the identification encoding means, for placing the retrieved information into a predetermined format as formatted data; and
    transmitter means, coupled to the conversion means, for transmitting the formatted data to the premises selected by the user, wherein the premises selected by the user is not limited to a predetermined user premises.

2. A transmission system as recited in claim 1, wherein the plurality of libraries are geographically separated.

3. A transmission system as recited in claim 1, wherein the premises selected by the user is geographically separated from the accessing location.

4. A digital audio/video communication network comprising:
    a reception system in data communication with a plurality of subscriber selectable receiving stations, the reception system comprising,
        means for receiving compressed, digitized data representing at least one item of audio/video information at a non-real time rate,
        means for storing a complete copy of the received compressed, digitized data, and
        means, responsive to the stored compressed, digitized data, for transmitting a representation of the at least one item of audio/video information at a real-time rate to at least one of the plurality of subscriber selectable receiving stations, wherein said means for receiving, said means for storing, and said means for transmitting are positioned at the same location, and wherein the at least one of the plurality of subscriber selectable stations is located at a premises geographically separated from the location of the reception system.

5. A digital audio/video communication network as recited in claim 4, wherein the means for transmitting comprises a converter for decompressing the compressed digitized data representing the at least one item of audio/video information.

6. A digital audio/video communication network as recited in claim 4, further comprising a processing station for formatting items of audio/video information as compressed, digitized data and transmitting the compressed, digitized data representing at least one item of audio/video information at the non-real time rate to the means for receiving.

7. A digital audio/video communication network as recited in claim 6, wherein the processing station comprises:
    means for inputting items of audio/video information;
    conversion means for placing each input item of audio/video information into a predetermined format as formatted data;
    compression means for compressing the formatted data; and
    transmitter means for sending compressed formatted data for the at least one item of audio/video information at the non-real time rate to the reception system.

8. A method of distributing audio/video information comprising:
    transmitting compressed, digitized data representing a complete copy of at least one item of audio/video information at a non-real time rate from a central processing location to a local distribution system remote from the central processing location;
    receiving, into a receiving means, the transmitted compressed, digitized data representing a complete copy of the at least one item;
    storing, in a storing means, the received compressed, digitized data representing the complete copy of the at least one item at the local distribution system; and
    in response to the stored compressed, digitized data, transmitting, using a transmitting means, a representation of the at least one item at a real-time rate to at least one of a plurality of subscriber selectable receiving stations coupled to the local distribution system, wherein the receiving means, the storing means, and the transmitting means are positioned at the same location, and wherein the at least one of the plurality of subscriber selectable stations is located at a premises geographically separated from the local distribution system.

9. A method as recited in claim 8, further comprising the step of decompressing the compressed, digitized data representing the complete copy of the at least one item of audio/video information before the transmitting step.

10. A method as recited in claim 9, wherein the decompressing step is performed in the local distribution system to produce the representation of the at least one item for transmission to the at least one of the plurality of subscriber selectable receiving stations.

11. A method of distributing audio/video information comprising:
    formatting items of audio/video information as compressed digitized data at a central processing location;
    transmitting compressed, digitized data representing a complete copy of at least one item of audio/video information from the central processing location;
    receiving, into a receiving means, the transmitted compressed, digitized data representing a complete copy of the at least one item of audio/video information at a local distribution system;
    storing, in a storing means, the received compressed, digitized data representing the complete copy of the at least one item at the local distribution system; and using the stored compressed, digitized data to transmit using a transmitting means a representation of the at least one item to at least one of a plurality of subscriber selectable receiving stations coupled to the local distribution system, wherein the receiving means, the storing means, and the transmitting means are positioned at the same location, and wherein the at least one of the plurality of subscriber selectable stations is located at a premises geographically separated from the location of the local distribution system.

* * * * *